(12) United States Patent
Fan et al.

(10) Patent No.: US 9,466,080 B2
(45) Date of Patent: Oct. 11, 2016

(54) BULK ORDER MANAGEMENT (75) Inventors: David Yee Man Fan, West Vancouver (CA); Arun Abichandani, Alameda, CA (US); Wen Xing Tao, Foster City, CA (US); Prasanna Ramachandran, Belmont, CA (US); Wei Si, Palo Alto, CA (US); Deepak Hazarika, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 2022 days.

(21) Appl. No.: 12/033,176

(22) Filed: Feb. 19, 2008

(65) Prior Publication Data
US 2009/0210268 A1 Aug. 20, 2009

(51) Int. Cl.
*G06F 17/30* (2006.01)
*G06Q 30/06* (2012.01)
*G06Q 40/00* (2012.01)

(52) U.S. Cl.
CPC ..... *G06Q 30/0603* (2013.01); *G06F 17/30994* (2013.01); *G06Q 30/0601* (2013.01); *G06Q 30/0609* (2013.01); *G06Q 40/12* (2013.12)

(58) Field of Classification Search
CPC .............. G06Q 30/0601; G06Q 30/0603; G06Q 30/0609; G06Q 40/12; Y10S 707/99945; Y10S 707/9994; G06F 17/30994
USPC ............................ 705/26.8, 30; 707/687–704
See application file for complete search history.

(56) References Cited

U.S. PATENT DOCUMENTS

| | | | |
|---|---|---|---|
| 6,427,143 B1 * | 7/2002 | Isip et al. | |
| 7,096,189 B1 * | 8/2006 | Srinivasan | 705/7.25 |
| 7,165,077 B2 * | 1/2007 | Kalies | |
| 7,240,054 B2 * | 7/2007 | Adiba et al. | |
| 7,689,467 B1 * | 3/2010 | Belanger | G06Q 30/0633 705/26.8 |
| 8,219,650 B2 * | 7/2012 | Krasinskiy et al. | 709/220 |
| 2003/0168259 A1 * | 9/2003 | Miller | G01G 19/4144 177/25.15 |
| 2007/0121850 A1 * | 5/2007 | Klos et al. | 379/114.28 |
| 2007/0150480 A1 * | 6/2007 | Hwang et al. | 707/10 |
| 2007/0192362 A1 * | 8/2007 | Caballero et al. | 707/104.1 |
| 2007/0214068 A1 * | 9/2007 | Tadepalli | G06Q 30/04 705/34 |
| 2008/0040233 A1 * | 2/2008 | Wildman et al. | 705/26 |
| 2009/0112928 A1 * | 4/2009 | Hoyt | G06F 17/30914 |

OTHER PUBLICATIONS

Siebel Order Management Guide Addendum for Industry Applications, version 7.5, Jan. 2003.*

* cited by examiner

Primary Examiner — Shew-Fen Lin
(74) Attorney, Agent, or Firm — Sheppard Mullin Richter & Hampton LLP (57) ABSTRACT A method includes creating a bulk order. The bulk order includes a plurality of action sets. Each action set represents a set of changes to a plurality of assets, and the bulk order represents, for a plurality of accounts, a plurality of services and assets. The method also includes validating the bulk order. The validating includes verifying a validity of a user name, which includes a validity of an association between the user name and the account and a validity of an association between the user name and the service. The validating also includes verifying the action set obeys a constraint of the product. The method also includes submitting the bulk order for execution of the set of changes. The submitting includes preparing the action set, executing the set of changes and changing a status of the bulk orders header to indicate a completion of the bulk order.

19 Claims, 7 Drawing Sheets

BULK ORDER MANAGEMENT

BACKGROUND

In many industries, such as telecommunications, business-to-business transactional relationships occur on a massive scale and are recorded in (sometimes distributed) databases containing thousands of records, with large numbers of field per record. The long course of these business-to-business transactional relationships frequently results in the need to update these very large databases to reflect changes to product and service offerings. Changes can be triggered by promotions, customer reorganization and realignment, new product offering, and new contract structures, among other things. Changes can include both changes to the content of fields and changes to the field structure of records.

The need for manual updates to such databases, in order to promulgate such changes, creates a host of undesirable results. For users of these databases, updates have proven to be an highly labor-intensive activity, with individual changes requiring manual entry of changes to thousands or millions of records. In addition to the intense need for labor to manage such updates, the updates tie down system resources for long periods of time as the updates are entered by hand. Finally, manual entry of data for changes increases the likelihood of error in entry, corrupting the data that can, for many companies, represent one of the organization's most valuable assets. All of this resource consumption and error introduction generates adverse impact on the bottom line of the business enterprise attempting to use the database to conduct activities that generate revenue. The scale of the problem is growing exponentially with the growth of database systems for monitoring business relationships.

SUMMARY

A method is disclosed. The method includes, creating a bulk order, wherein the bulk order includes a plurality of action sets. Each action set of the plurality of action sets represents a set of changes to a plurality of assets, and the bulk order represents, for a plurality of accounts, a plurality of services and assets. The method also includes validating the bulk order, wherein the validating includes verifying a validity of a user name. The validity of the user name includes a validity of an association between the user name and the account and a validity of an association between the user name and the service. The validating also includes verifying the action set obeys a constraint of the product. The method also includes submitting the bulk order for execution of the set of changes, wherein the submitting includes preparing the action set for execution, executing the set of changes to the plurality of assets and changing a status of the bulk orders header to indicate a completion of the bulk order.

BRIEF DESCRIPTION OF THE DRAWINGS

A more complete understanding of the present invention can be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

The present invention provides a system of workflows, interfaces, processes, systems and methods for performing large-scale changes to a database. A bulk orders interface enables a user of a client to interact with a bulk orders data structure that an application server uses to make changes to a database. The application structure can use external data for the changes, and validation of changes is provided by the present invention.

Figure 1:
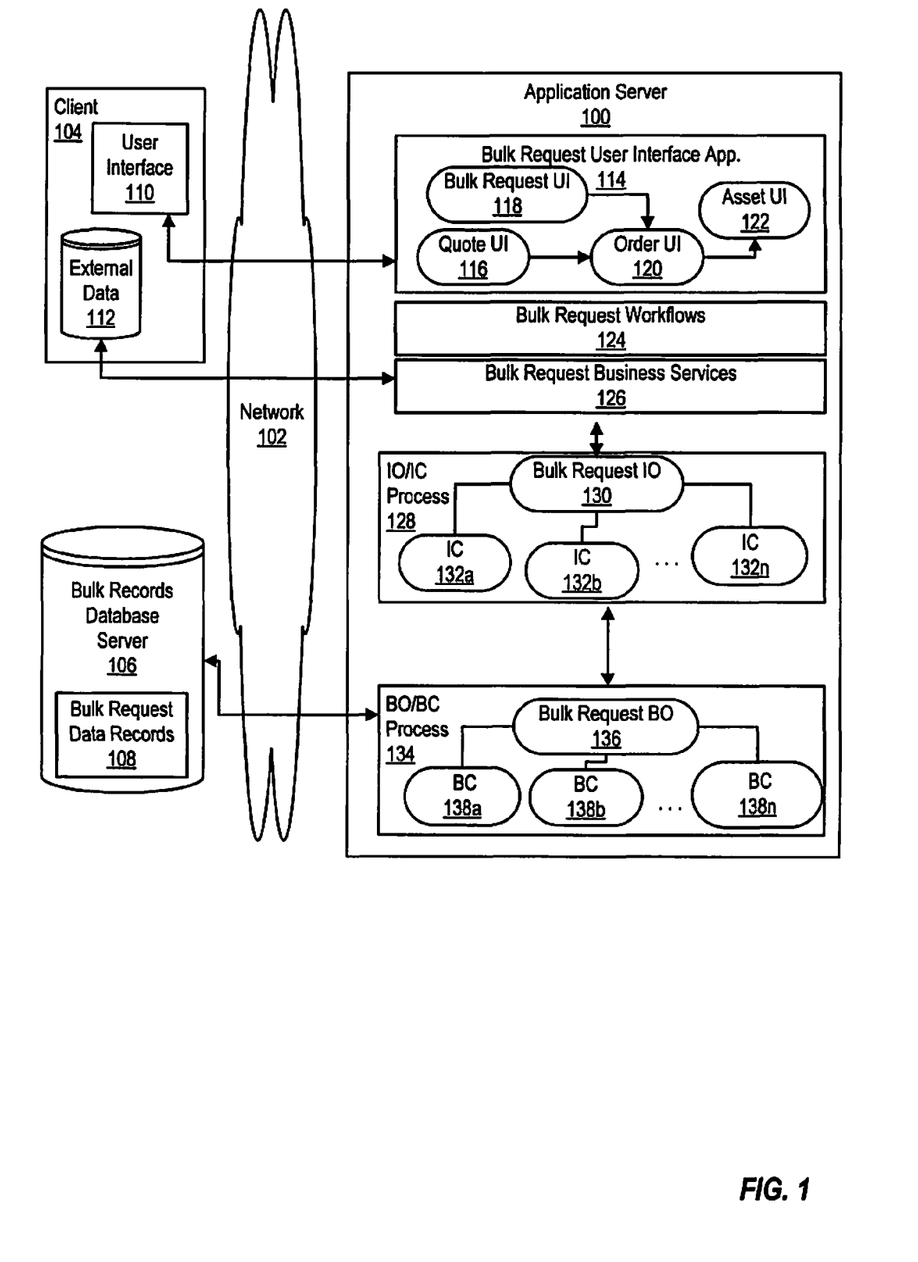
FIG. 1 depicts a component diagram of a system for executing a bulk change order, in accordance with one embodiment of the present invention.

With reference now to the figures, and in particular with reference to FIG. 1, a component diagram of a system for executing a bulk change order in accordance with one embodiment of the present invention is depicted. In one embodiment of the present invention, an application server 100 communicates across a network 102 with a client 104 and a bulk records database server 106. Bulk records database server 106 contains one or more bulk request data records 108 that, in some embodiments, span a group of database tables. Bulk request data records represent groups of assets linked to groups of services supplied to groups of accounts. Each account is embodied by multiple bulk request data records 108, which may span multiple database tables. Client 104 executes a user interface 110 and holds an external data store 112, which allows data to be specified in external formats, such as spreadsheet or XML files that are imported into bulk records database server 106. While external data store 112 is shown, in the embodiment portrayed in FIG. 1, as residing on client 104, one skilled in the art will quickly realize, in light of the present disclosure, that alternative embodiments of the present invention will allow external data store 112 to be incorporated on other devices residing on network 102 without departing from the scope of the present invention.

Application server 100 executes a bulk request user interface application 114, which generates a quote user interface 116, a bulk request user interface 118, an orders user interface 120 and an asset user interface 122. A bulk request workflows module 124 on application server 100 supports bulk request user interface application 114 and allows the user to specify and process bulk requests. The user invokes the workflows associated with bulk request workflows module 124 from the user interface 110 of client 102 by clicking the appropriate buttons in the user interface thus generated. Bulk request workflow processes within bulk request workflows module 124 implement the bulk request import and processing functionality of the present invention. Bulk request workflows module 124 calls custom business services to implement the specialized bulk request processing logic of the present invention (e.g., a bulk request business services module 126, described subsequently).

In one embodiment of the present invention workflows supported by bulk request workflows module 124 include:

| | |
|---|---|
| Bulk Request Import Workflow | Imports a template file |
| Bulk Request - Submit Driver Process | Submits the bulk request process asynchronously, and updates the status to "Queued" on the bulk request header. |
| Bulk Request - Submit Process | Validates and processes the bulk request generating order line items for each valid action/instance combination. |
| Bulk Request - Prepare Action Set Sub-Process | Creates an order for each action set. |
| Bulk Request - Process Actions Sub-Process | Loops through the consolidated action items to call the sub-process to create line items for each user. |
| Bulk Request - Add Sub-Process | Generates a new configured product instance for each instance (user). |
| Bulk Request - Modify Sub-Process | Generates order line items to update instance assets where the action code of consolidated action is update. |
| Bulk Request - Delete Sub-Process | Generates an order line item where the action code of consolidated action is delete. |
| Bulk Request - Suspend/Resume Sub-Process | Generates an order line item where the action code of consolidated action is suspend or resume. |
| Bulk Request - Upgrade Sub-Process | Generates an order line item where the action code of consolidated action is upgrade. |
| Notify User Sub-Process | Creates an Inbox notification for the specified user. |
| Bulk Request - Add Items Customize Process | Customizes product when action set type is New and invokes a configurator. |
| Bulk Request - Add Items Customize Sub-Process | Launches a configurator runtime session to allow the user to customize the product instance. |
| Bulk Request Cancel Process | Terminates the bulk request processing. |
| Bulk Request - Clear Exception Process | Iterates through the selected exceptions and invokes the Bulk Request - Clear Exception Sub-Process for each. |
| Bulk Request - Clear Exception Sub-Process | Sets the cleared date for the selected exception. |
| Reset Process | Iterates through the selected exceptions and invokes the Bulk Request - Clear Exception Sub-Process for each. |
| Bulk Request - Reset Sub-Process | Sets the cleared date for the selected exception and sets the Submit flag to 'Yes' for the associated user. |

Bulk request business services module 126 communicates with external data store 112 on client 104 across network 102. Bulk request business services module 126 implements discrete functions that comprise the processing logic for one embodiment of the present invention. The business service methods of bulk request business services module 126 query and update data using an integration object 130 mapped to business components 138a-138n.

Bulk request business services module 126 interacts with an integration object and integration components (IO/IC) module 128 containing an integration object 130 and integration components 132a-132n. IO/IC module 128 interacts with a business object and business components (BO/BC) module 134 containing a business object 136 and business components 138a-138n. BO/BC module 134 defines the data objects specific to bulk requests. Business components 138a-138n are mapped to tables in bulk records database server 106, which stores the bulk request data in bulk request data records 108. Business object 136 supports business components 138a-138n, which provide a series of handling routines for entry of line items and orders, header handling, action set handling, sequencing of operations, exception handling, instance identification and other functions useful to an embodiment of the present invention. In one embodiment, business object 136 provides an organizational structure for managing business components 138a-138n that embody, among other things, the functions described as flowcharts in FIG. 5 and FIG. 6.

As used in reference to the present invention, notation such as 138a-138n indicates a variable quantity of devices, and the presence of differently numbered devices bearing the same reference letter (e.g., 102a and 100a), does not necessarily indicate a correspondence or interaction between differently numbered devices bearing the same reference letter. Further, the recurrence of 'n' as an alphabetical designator does not indicate that multiple flexibly variable quantities of devices are equal. Nor does the designation of a single member of such a plurality as 'n' indicate that it necessarily corresponds to an 'nth' member of a different plurality, though they can correspond.

One skilled in the art will also realize, in light of the present disclosure, that while application server 100, client 104, and bulk records database server 106 are illustrated in FIG. 1 as free-standing instruction sets executing on the processors and stored on the computer-readable media associated with independent hardware systems communicating across network 102, alternative embodiments and implementations of the present invention can combine application server 100, client 104, and bulk records database server 106 or various elements of the functions and processes that they embody into integrated systems. These alternative embodiments and implementations of the present invention do not depart from the scope of the present invention.

While illustrated as a free-standing client 102 composed of dedicated hardware and software in the preferred embodiment illustrated in FIG. 1, user interface 110 can, in some alternative embodiments that do not depart from the scope of the present invention, be executed as pages received from bulk request user interface application 114 on a browser running on client 102.

Figure 2:
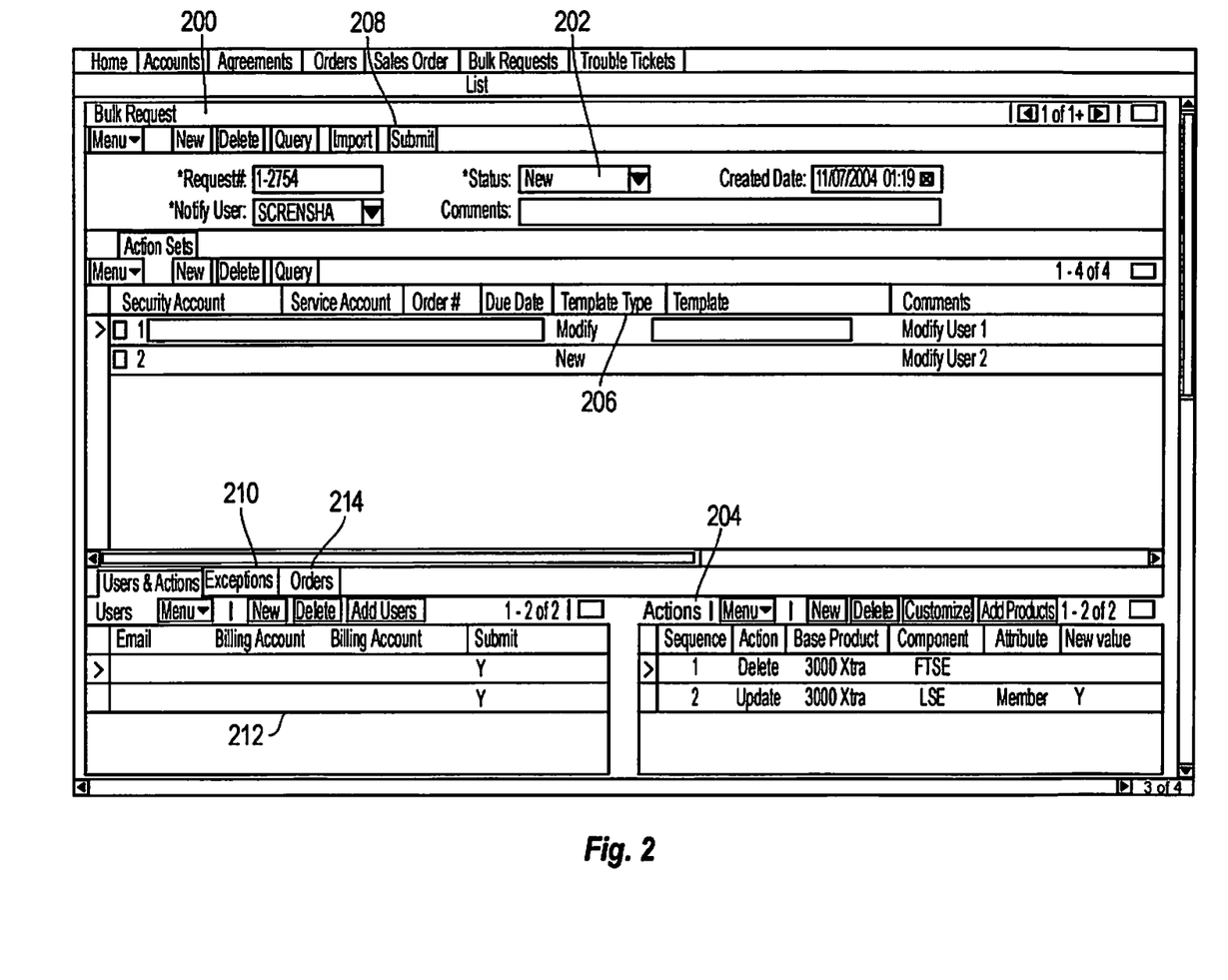
FIG. 2 illustrates a bulk request user interface, in accordance with one embodiment of the present invention.

Turning now to FIG. 2, a bulk request graphical user interface (an example of a bulk request user interface 118), in accordance with one embodiment of the present invention is illustrated. A bulk request display panel 200 contains a status picklist 202, a bulk request action type display field 204, a bulk request action set display field 206, a bulk request submit status control 208, a bulk request exception display control 210, an instance listing 212 and an orders listing 214.

In one embodiment status picklist 202 supports several status settings, including, for example, New, Queued, Partially Complete, Complete, Cancel Pending and Cancelled. Bulk request action type display field 204 supports several action types, including, for example, Add, Delete, Update, Upgrade, Suspend and Resume. Bulk request action set display field 206 supports several action set types, including, for example New, Modify and Upgrade. Bulk request submit control 208 allows the user to submit a bulk change request for execution, which can lead to a change in the value of submit status to one of, for example, To Process, Processed, Error and Partially Processed. Bulk request exception display control 210 supports several exception types including, for example Action Set, Action, Instance and Instance Action. Instances to which actions are applied are reflected in an instance listing 212. Orders listing 214 reflect results of a bulk change.

Figure 3:
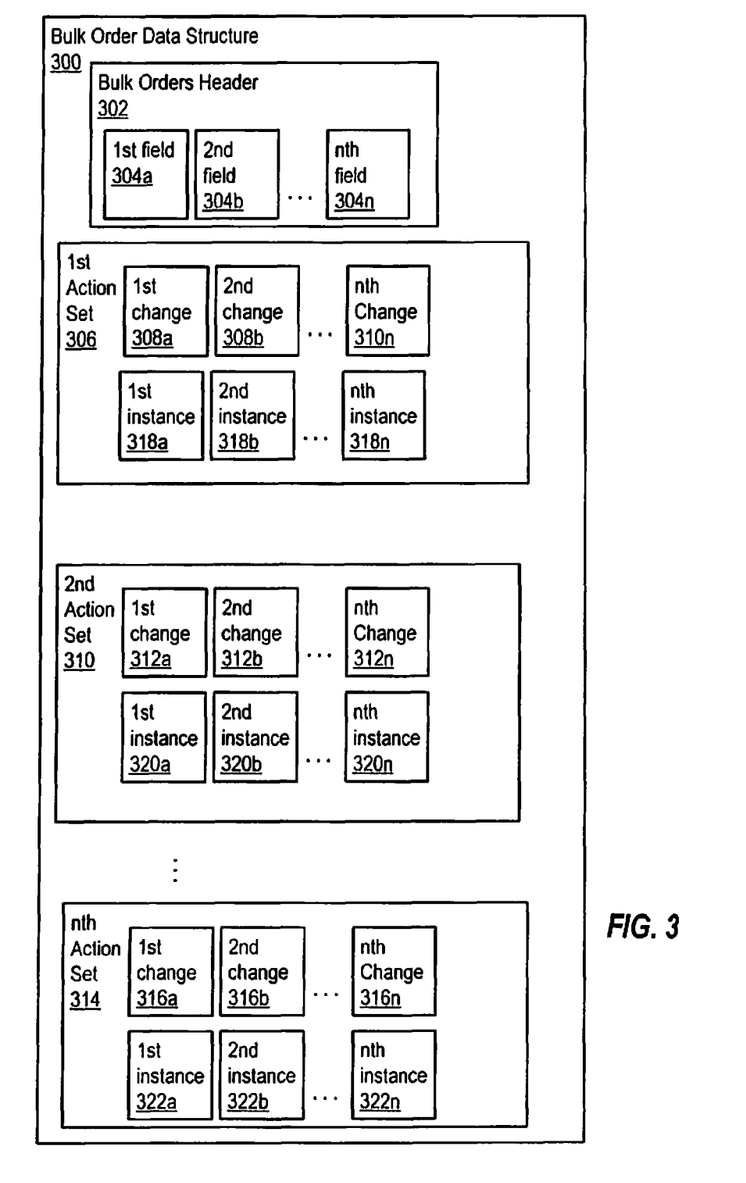
FIG. 3 depicts a component diagram of a bulk orders data structure, in accordance with one embodiment of the present invention.

Referring now to FIG. 3, a component diagram of a bulk orders data structure in accordance with one embodiment of the present invention is depicted. Bulk orders data structure 300 contains a bulk orders header 302 and a configurably large number of action sets, including, in the example depicted in FIG. 3, a first action set 306, a second action set 310, and an nth action set 314. Bulk orders header 302 contains a set of fields 304*a*-304*n*, which serve as, in one embodiment, a central bookkeeping repository for the processing of bulk orders data structure 300. Set of fields 304*a*-304*n* allows for the storage of information about the processing of bulk orders data structure 300. Set of fields 304*a*-304*n* can contain information with respect to whether an action set from among first action set 306, second action set 310, and nth action set 314 has been processed, or its state of processing, and whether exceptions, which are discussed with respect to FIG. 6 below, have occurred.

First action set 306 contains a set of changes 308*a*-308*n* and a set of instances 318*a*-318*n* to which set of changes 308*a*-308*n* is applied. Each set of changes 308*a*-308*n* represents a modification, addition, or deletion (or, in some embodiments, another adjustment) to a record represented by a corresponding instance from set of instances 318*a*-318*n*, which represents records in bulk request data records 108. Second action set 310 contains a set of changes 312*a*-312*n* and a set of instances 320*a*-320*n* to which set of changes 312*a*-312*n* is applied. Nth action set 314 contains a set of changes 316*a*-316*n* and a set of instances 322*a*-322*n* to which set of changes 316*a*-316*n* is applied. Each action set contains a set of changes (actions) as well as a set of instances to which the actions are applied. The bulk order represented by bulk orders data structure 300 represents, for a set of accounts, a group of services and assets. Each action set from among a first action set 306, second action set 310, and nth action set 314 represents a set of changes to a set of assets. In one embodiment, a set of changes are executed to a set of assets.

Figure 4:
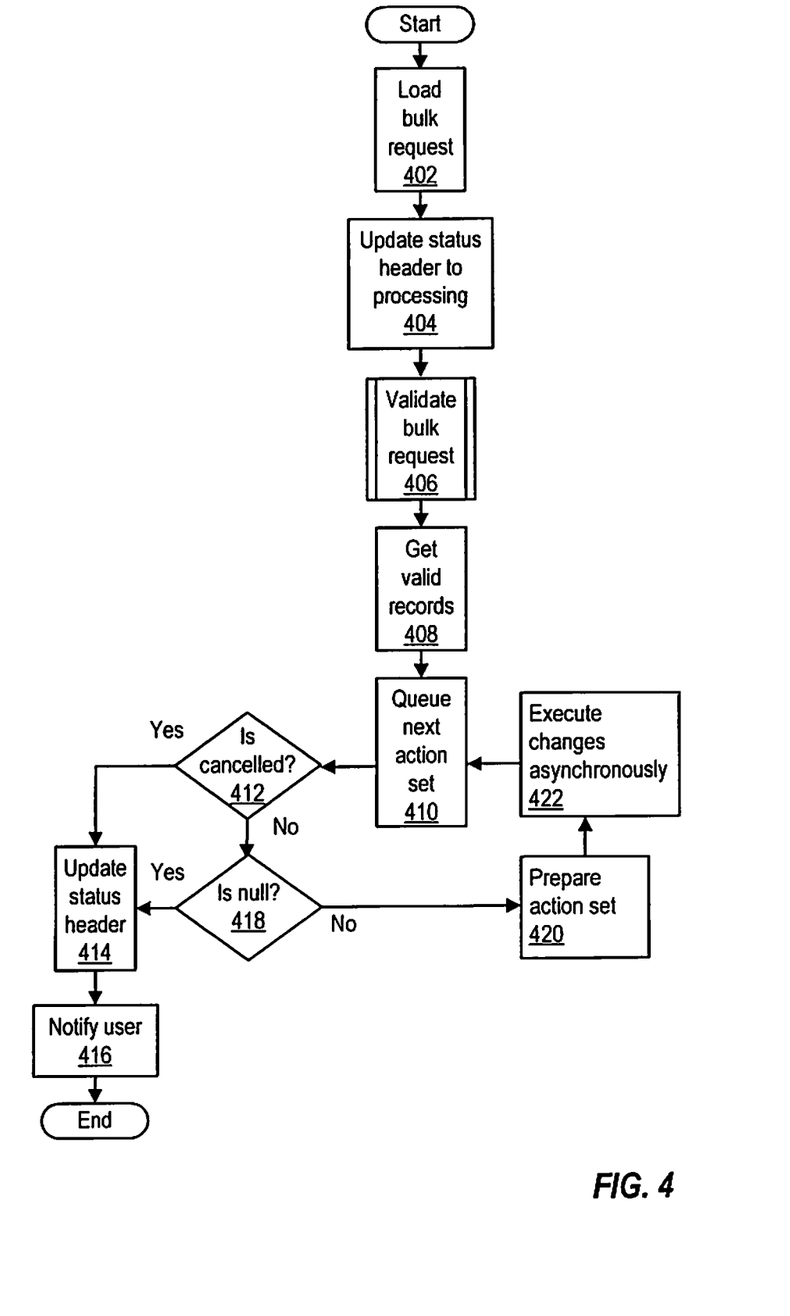
FIG. 4 illustrates flowchart of a process for executing a bulk change order, in accordance with one embodiment of the present invention.

Turning now to FIG. 4, a flowchart of a process for executing a bulk change order in accordance with one embodiment of the present invention is illustrated. At step 402, bulk request business services module 126 loads a bulk orders data structure 300. The process then moves to step 404, which illustrates BO/BC process 134 updating a status field from among fields 304*a*-304*n* of bulk orders header 302 to "processing". The process next proceeds to step 406. Step 406 depicts BO/BC process 134 validating bulk orders data structure 300, a process shown in greater detail in FIG. 6. The process then moves to step 408, which illustrates BO/BC process 134 retrieving records from bulk request data records 108 for which valid action sets exist in bulk orders data structure 300.

The process next proceeds to step 410. Step 410 depicts BO/BC process 134 queuing a next action set from among of bulk orders data structure 300 for execution. The process then moves to step 412, which illustrates BO/BC process 134 determining whether the execution of action sets contained in bulk orders data structure 300 is cancelled. In one embodiment, determining whether the execution of action sets contained in bulk orders data structure 300 is cancelled is performed by referring to bulk orders header 302 and reading its fields 304*a*-304*n* for a "cancel" status. If BO/BC process 134 determines that the execution of action sets contained in bulk orders data structure 300 is cancelled, then the process next proceeds to step 414. Step 414 depicts BO/BC process 134 updating a status field from among fields 304*a*-304*n* of bulk orders header 302 to reflect processing of first action set 306, second action set 310, and nth action set 314. The process then moves to step 416, which illustrates bulk request user interface 118 notifying a user of the end of the process.

Returning to step 412, if BO/BC process 134 determines that the execution of action sets contained in bulk orders data structure 300 is not cancelled, then the process next proceeds to step 418. Step 418 depicts BO/BC process 134 determining whether the action set queued in step 410 is a null set. If BO/BC process 134 determines that the action set queued in step 410 is a null set, then the process proceeds to step 414, which is described above. However, if BO/BC process 134 determines that the action set queued in step 410 is not a null set, then the process proceeds to step 420, which illustrates BO/BC process 134 preparing the action set queued in step 410 for execution. The process next moves to step 422. Step 422 illustrates BO/BC process 134 executing the action set queued in step 410. The process then returns in step 410, which is described above.

Figure 5:
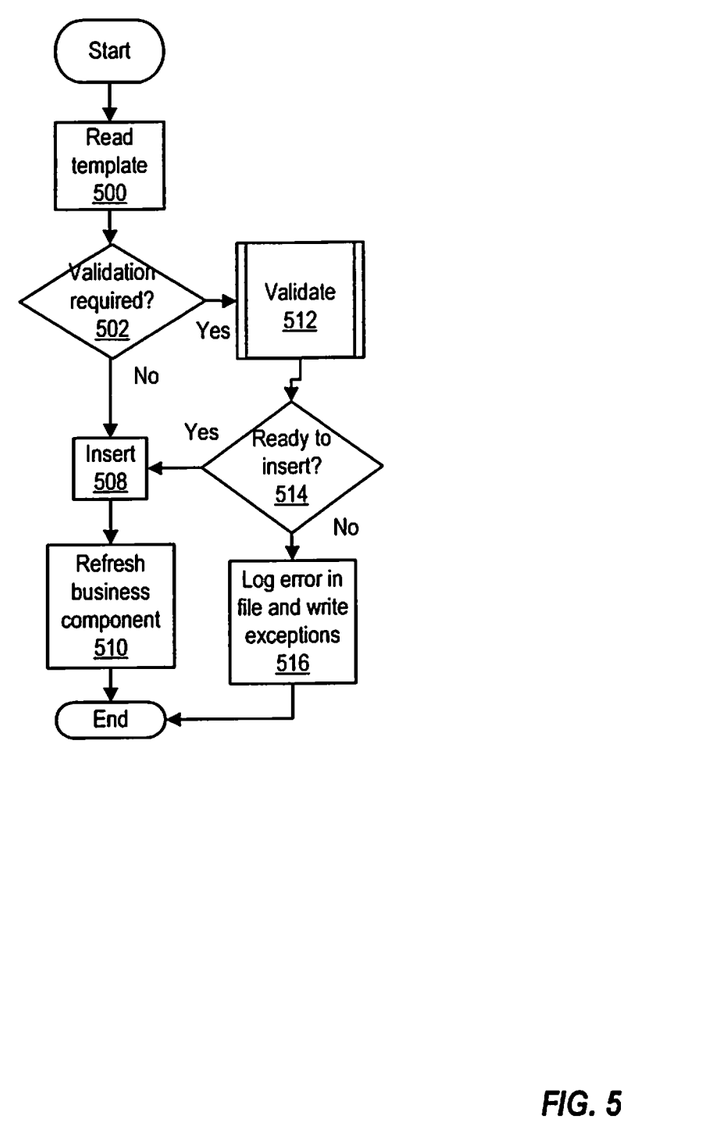
FIG. 5 depicts a flowchart of a process for importing a bulk change order, in accordance with one embodiment of the present invention.

Referring now to FIG. 5, a flowchart of a process for importing a bulk change order in accordance with one embodiment of the present invention is depicted. At step 500, bulk request business services module 126 reads a template for external data 112 received from client 104. The process proceeds to step 502, which depicts bulk request business services module 126 determining whether validation of external data 112 received from client 104 is required. If bulk request business services module 126 determines that validation of external data 112 received from client 104 is required, then the process next moves to step

512. Step 512 illustrates bulk request business services module 126 validating external data 112 received from client 104, a process shown in greater detail in FIG. 6.

The process then proceeds to step 514, which depicts bulk request business services module 126 determining whether external data 112 received from client 104 is ready to insert into a bulk order data structure 300. If bulk request business services module 126 determines that external data 112 received from client 104 is not ready to insert into bulk order data structure 300, then the process next moves to step 516. Step 516 illustrates bulk request business services module 126 logging an error in a memory and writing exceptions. The process then ends.

Returning to step 502, if bulk request business services module 126 determines that validation of external data 112 received from client 104 is not required, then the process next moves to step 508, which depicts bulk request business services module 126 inserting external data 112 received from client 104 bulk order data structure 300. The process next moves to step 510. Step 510 depicts bulk request business services module 126 refreshing a business component 138n. The process then ends.

Returning to step 514, if bulk request business services module 126 determines that external data 112 received from client 104 is ready to insert into bulk order data structure 300, then the process next moves to step 508, which is described above.

Figure 6:
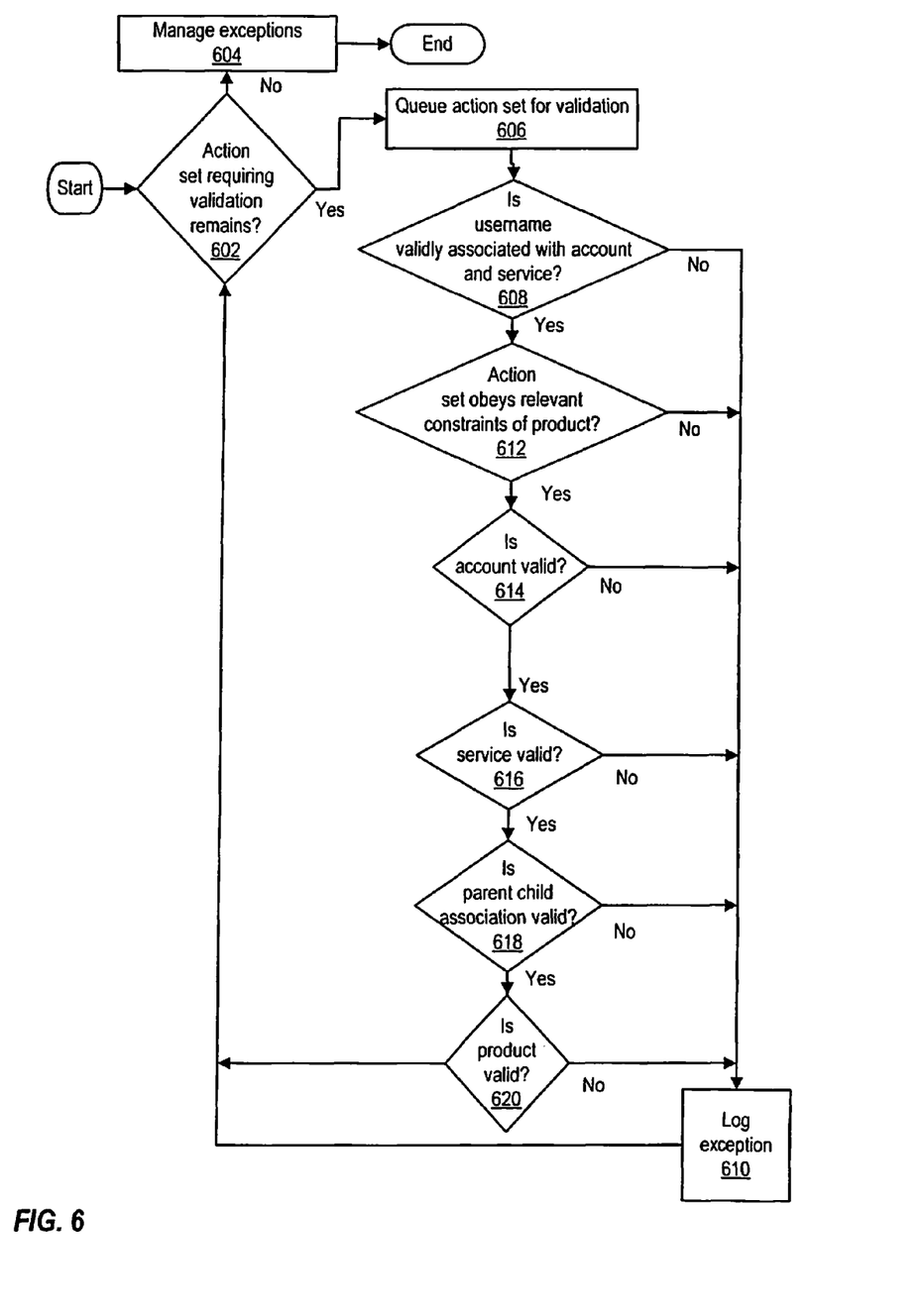
FIG. 6 illustrates a flowchart of a process for validating an action set in accordance with one embodiment of the present invention, in accordance with one embodiment of the present invention.

Turning now to FIG. 6, a flowchart of a process for validating an action set in accordance with one embodiment of the present invention is illustrated. At step 602, bulk request workflows module 124 determines whether any action set within bulk order data structure 300 requiring validation remains. If bulk request workflows module 124 determines that no action set within bulk order data structure 300 requiring validation remains, then the process proceeds to step 604, which depicts bulk request workflows module 124 managing any exceptions that may have occurred.

If an action from among first action set 306, second action set 310, and nth action set cannot, for any reason, be processed, an exception is associated with the bulk request and logged in set of fields 304a-304n. A field 304n listing an exception includes a textual description of the fault so that a customer service representative can review and resolve the error. In step 604, user interface 110 creates a new applet to display the exceptions associated with bulk order data structure 300. A customer service representative resolves the errors, by selecting the exception in the applet, adjusting fields as appropriate, and setting the value of the Submit field on the parent bulk request instance to 'to process'. When the bulk request is resubmitted, the actions associated with exceptions that have been reset are reprocessed. The process then ends.

Returning to step 602, if bulk request workflows module 124 determines that an action set any action set within bulk order data structure 300 requiring validation remains, then the process proceeds to step 606. Step 606 illustrates bulk request workflows module 124 queuing for validation an action set within bulk order data structure 300. The process proceeds to step 608, which depicts bulk request workflows module 124 determining whether a user specified within the action set queued in step 606 is validly associated with an account and service. If bulk request workflows module 124 determines that a user specified within the action set queued in step 606 is not validly associated with an account and service, then the process proceeds to step 610. Step 610 illustrates bulk request workflows module 124 logging an exception. The process then returns to step 602, which is described above.

Returning to step 608, if bulk request workflows module 124 determines that a user specified within the action set queued in step 606 is validly associated with an account and service, then the process proceeds to step 612, which depicts bulk request workflows module 124 determining whether an action within the action set queued in step 606 obeys a constraint of a relevant product. If bulk request workflows module 124 determines that action within the action set queued in step 606 does not obey a constraint of a relevant product, then process proceeds to step 610, which is described above. If bulk request workflows module 124 determines that action within the action set queued in step 606 obeys a constraint of a relevant product, then process proceeds to step 614. Constraints can, for example, represent design or provisioning limitations of a product. For instance, in one embodiment of the present invention, a product, such as a telephone handset, may be subject to a constraint that the total number of handsets assigned to an asset, such as a private branch exchange, may not exceed the number of digital line cards assigned to the asset.

Step 614 illustrates bulk request workflows module 124 determining whether an account specified in the action set queued in step 606 is valid. If bulk request workflows module 124 determines that an account specified in the action set queued in step 606 is not valid, then process proceeds to step 610, which is described above. If bulk request workflows module 124 determines that an account specified in the action set queued in step 606 is valid, then the process proceeds to step 616, which depicts bulk request workflows module 124 determining whether a service specified in the action set queued in step 606 is valid. If bulk request workflows module 124 determines that a service specified in the action set queued in step 606 is not valid, then process proceeds to step 610, which is described above. If bulk request workflows module 124 determines that a service specified in the action set queued in step 606 is valid, then the process proceeds to step 618.

Step 618 illustrates bulk request workflows module 124 determining whether a parent-child association specified in the action set queued in step 606 is valid. In one embodiment, a parent-child association exists between a service and an account. Bulk request workflows module 124 verifies that a service and an account specified in the action set have a valid parent-child association. If bulk request workflows module 124 determines that a parent-child association specified in the action set queued in step 606 is not valid, then process proceeds to step 610, which is described above. If bulk request workflows module 124 determines that a parent-child association specified in the action set queued in step 606 is valid, then the process proceeds to step 620, which depicts bulk request workflows module 124 determining whether a product specified in the action set queued in step 606 is valid. Determining whether a product specified in the action set queued in step 606 is valid includes determining whether a component of the product is valid. If bulk request workflows module 124 determines that a product specified in the action set queued in step 606 is not valid, then process proceeds to step 610, which is described above. If bulk request workflows module 124 determines that a product specified in the action set queued in step 606 is valid, then the process returns to step 602, which is described above.

Figure 7:
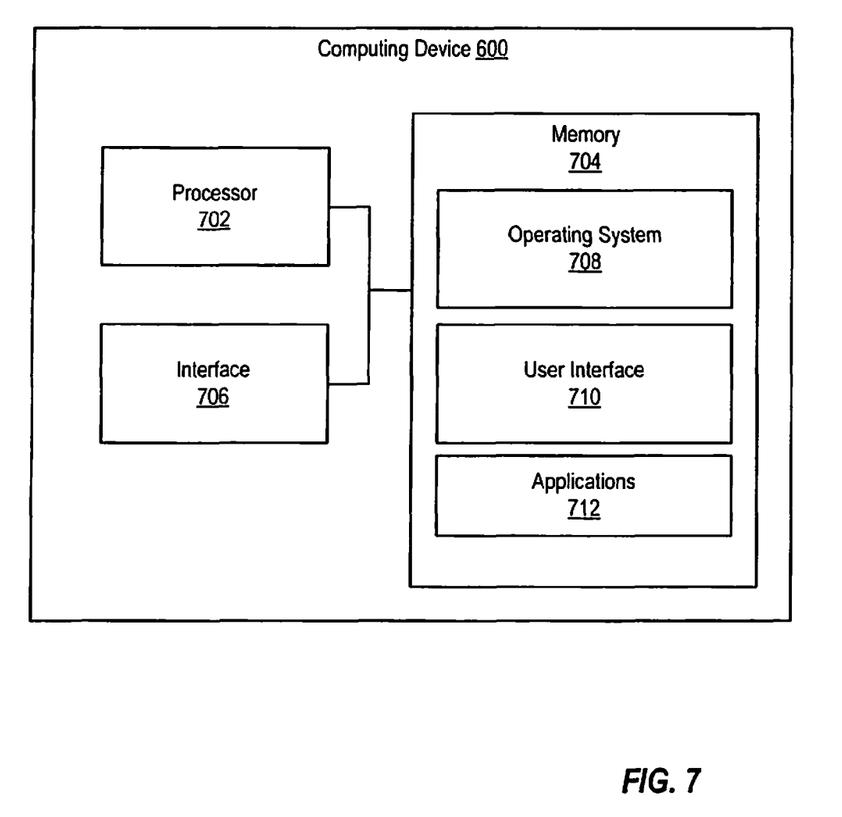
FIG. 7 is a block diagram of a computing device suitable for implementing various embodiments of the present disclosure.

FIG. 7 is a block diagram of a computing device 700 that implements either of application server 100 or client 104, or both, and can participate in processing of bulk change requests, according to one embodiment of the present invention. It is noted that, in at least some embodiments, bulk records database server 106 is integrated with application server 100.

As illustrated, computing device 700 includes one or more processors 702 (e.g., microprocessors, PLDs (Programmable Logic Devices), or ASICs (Application Specific Integrated Circuits)) configured to execute program instructions stored on or in a computer-readable storage medium such as memory 704. Memory 704 can include various types of RAM (Random Access Memory), ROM (Read Only Memory), Flash memory, MEMS (Micro Electro-Mechanical Systems) memory, and the like. Computing device 700 also includes one or more interfaces 706. Processor 702, memory 704, and interface 706 are coupled to send and receive data and control signals by a bus or other interconnect.

Interface(s) 706 can include an interface to a storage device on which information to be backed up or restored is stored. Interface(s) 706 can also include an interface to a network (e.g., network 102 of FIG. 1) for use in communicating with a separate computing device.

The program instructions and data implementing functions of client 104, application server 100, applications 712, user interface 710 and operating system 708 can be stored on various computer readable storage media such as memory 704. In some embodiments, such software is stored on a computer readable storage medium such as a CD (Compact Disc), DVD (Digital Versatile Disc), hard disk, optical disk, tape device, floppy disk, and the like). In order be executed by processor 702, the instructions and data implementing client 104, application server 100, applications 712, user interface 710 and operating system 708 are loaded into memory 704 from the other computer readable medium. The instructions and/or data can also be transferred to computing device 700 for storage in memory 704 via a network such as the Internet or upon a carrier medium. In some embodiments, the instructions may be carried by a carrier medium such as a network and/or a wireless link upon which signals such as electrical, electromagnetic, or digital signals, on which the data and instructions implementing client 104, application server 100, applications 712, user interface 710 and operating system 708 are encoded, are conveyed.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
creating a bulk order embodied in a bulk order data structure, the bulk order data structure comprising
a bulk orders header and
a plurality of action sets, wherein
the bulk orders header comprises a plurality of status fields,
each of the plurality of status fields is associated with a respective one of the plurality of action sets,
each of the plurality of action sets identify a set of changes to be made to one or more data records, and
the one or more data records are associated with a plurality of assets associated with a plurality of customer accounts;
executing said bulk order, wherein said executing comprises:
validating a first subset of the plurality of action sets, wherein the validating comprises, for each action set of the first subset of the plurality of action sets, verifying a validity of an association between a user name of the action set and an account of the action set, an association between the user name of the action set and a service of the action set, and a parent-child association specified in the action set,
in response to the validating the first subset of the plurality of action sets, applying the set of changes identified by the first subset of the plurality of action sets to said plurality of data records, resulting in changes to a first plurality of assets and a first plurality of customer accounts, and updating the plurality of status fields to indicate completion for each action set of the first subset of the plurality of action sets,
determining one or more exceptions for a second subset of the plurality of action sets,
in response to the determining one or more exceptions for the second subset of the plurality of actions sets, updating the plurality of status fields to indicate an exception for each action set of the second subset of the plurality of action sets,
updating the bulk orders header with one or more textual explanations identifying each exception for the second subset of the plurality of action sets,
presenting the one or more textual explanations identifying each exception for the second subset of the plurality of action sets, and
receiving one or more adjusted fields for the second subset of the plurality of action sets; and
re-executing said bulk order, wherein said re-executing comprises applying the one or more changes identified by the second subset of the plurality of action sets without re-applying the one or more changes identified by the first subset of the plurality of action sets.

2. The method of claim 1, wherein:
each of said plurality of assets is linked to a plurality of services;
each of said plurality of services is supplied to said plurality of customer accounts;
each of said plurality of customer accounts is embodied by said plurality of data records; and
said plurality of data records span a plurality of database tables.

3. The method of claim 1, further comprising:
determining whether a first action set from among said plurality of action sets requires validation.

4. The method of claim 1, further comprising:
verifying validity of a product, wherein
said validity of said product comprises validity of a specified component of said product, and
a first action set of the plurality of action sets comprises said product;
setting a field from among a plurality of fields to a valid value for said field; and
verifying that an action of said first action set obeys a constraint of said product.

5. The method of claim 1, wherein said method further comprises:
sending to a user a notification of completion of said bulk order.

6. The method of claim 1, further comprising:
submitting said bulk order through a graphical user interface for asynchronous execution of said plurality of action sets.

7. The method of claim 1, wherein the executing further comprises determining a status of an action set, wherein
the executing is performed if the status is configured to process the execution of the bulk order, and
the executing is not performed if the status is configured to cancel the execution of the bulk order.

8. The method of claim 1, wherein the presenting the one or more textual explanations and the receiving one or more adjusted fields are performed via an applet.

9. A system comprising:
at least one processor, and
a memory storing instructions that, when executed by the at least one processor, cause the system to perform a method comprising:
creating a bulk order embodied in a bulk order data structure, the bulk order data structure comprising
a bulk orders header and
a plurality of action sets, wherein
the bulk order header comprises a plurality of status fields,
each of the plurality of status fields is associated with a respective one of the plurality of action sets,
each of the plurality of action sets identify a set of changes to be made to one or more data records, and
the one or more data records are associated with a plurality of assets associated with a plurality of customer accounts;
executing said bulk order, wherein said executing comprises:
validating a first subset of the plurality of action sets, wherein the validating comprises, for each action set of the first subset of the plurality of action sets, verifying a validity of an association between a user name of the action set and an account of the action set, an association between the user name of the action set and a service of the action set, and a parent-child association specified in the action set,
in response to the validating the first subset of the plurality of action sets, applying the set of changes identified by the first subset of the plurality of action sets to said plurality of data records, resulting in changes to a first plurality of assets and a first plurality of customer accounts, and updating the plurality of status fields to indicate completion for each action set of the first subset of the plurality of action sets,
determining one or more exceptions for a second subset of the plurality of action sets,
in response to the determining one or more exceptions for the second subset of the plurality of actions sets, updating the plurality of status fields to indicate an exception for each action set of the second subset of the plurality of action sets,
updating the bulk orders header with one or more textual explanations identifying each exception for the second subset of the plurality of action sets,
presenting the one or more textual explanations identifying each exception for the second subset of the plurality of action sets, and
receiving one or more adjusted fields for the second subset of the plurality of action sets; and re-executing said bulk order, wherein said re-executing comprises applying the one or more changes identified by the second subset of the plurality of action sets without re-applying the one or more changes identified by the first subset of the plurality of action sets.

10. The system of claim 9, wherein:
each of said plurality of assets is linked to a plurality of services;
each of said plurality of services is supplied to said plurality of customer accounts;
each of said plurality of customer accounts is embodied by said plurality of data records; and
said plurality of data records span a plurality of database tables.

11. The system of claim 9, wherein the method further comprises:
determining whether a first action set from among said plurality of action sets requires validation.

12. The system of claim 9, wherein the method further comprises:
verifying validity of a product, wherein
said validity of said product comprises validity of a specified component of said product, and
a first action set of the plurality of said action sets comprises said product;
setting a field from among a plurality of fields to a valid value for said field; and
verifying that an action of said first action set obeys a constraint of said product.

13. The system of claim 12, wherein the method further comprises
sending to a user a notification of completion of said bulk order.

14. The system of claim 9, wherein the method further comprises:
submitting said bulk order through a graphical user interface for asynchronous execution of said plurality of action sets.

15. A computer program product, comprising:
a non-transitory computer-readable storage medium;
instructions stored on the non-transitory computer-readable storage medium for creating a bulk order, wherein
said bulk order is embodied in a bulk order data structure,
said bulk order data structure comprises
a bulk orders header and
a plurality of action sets, wherein
the bulk orders header comprises a plurality of status fields,
each of the plurality of status fields is associated with a respective one of the plurality of action sets,
each of the plurality of action sets identify a set of changes to be made to one or more data records, and
the one or more data records are associated with a plurality of assets associated with a plurality of customer accounts;
instructions stored on the non-transitory computer-readable storage medium for executing said bulk order, wherein said instructions for executing comprises
instructions for validating a first subset of the plurality of action sets, wherein the validating comprises, for each action set of the first subset of the plurality of action sets, verifying a validity of an association between a user name of the action set and an account of the action set, an association between the user name of the action set and a service of the action set, and a parent-child association specified in the action set, instructions for, in response to the validating the first subset of the plurality of action sets, applying the set of changes identified by the first subset of the plurality of action sets to said plurality of data records, resulting in changes to a first plurality of assets and a first plurality of customer accounts, and updating the plurality of status fields to indicate completion for each action set of the first subset of the plurality of action sets, instructions for determining one or more exceptions for a second subset of the plurality of action sets, instructions for, in response to the determining one or more exceptions for the second subset of the plurality of action sets, updating the plurality of status fields to indicate an exception for each action set of the second subset of the plurality of action sets, instructions for updating the bulk orders header with one or more textual explanations identifying each exception for the second subset of the plurality of action sets, instructions for presenting the one or more textual explanations identifying each exception for the second subset of the plurality of action sets, and instructions for receiving one or more adjusted fields for the second subset of the plurality of action sets; and instructions stored on the non-transitory computer-readable storage medium for re-executing the bulk order, wherein said instructions for re-executing comprise instructions for applying the one or more changes identified by the second subset of the plurality of action sets without re-applying the one or more changes identified by the first subset of the plurality of action sets.

16. The computer program product of claim 15, wherein:
each of said plurality of assets is linked to a plurality of services;
each of said plurality of services is supplied to said plurality of customer accounts;
each of said plurality of customer accounts is embodied by said plurality of data records, and
said plurality of data records span a plurality of database tables.

17. The computer program product of claim 15, further comprising:
instructions stored on the non-transitory computer-readable storage medium for determining whether a first action set from among said plurality of action sets requires validation.

18. The computer program product of claim 15, further comprising:
instructions stored on the non-transitory computer-readable storage medium for verifying validity of a product, wherein
said validity of said product comprises validity of a specified component of said product, and
a first action set of the plurality of action sets comprises said product;
instructions stored on the non-transitory computer-readable storage medium for setting a field from among a plurality of fields to a valid value for said field; and
instructions stored on the non-transitory computer-readable storage medium for verifying that an action of said first action set obeys a constraint of said product.

19. The computer program product of claim 18, wherein said computer program product in a computer-readable storage medium further comprises:
instructions stored on the non-transitory computer-readable storage medium for sending to a user a notification of completion of said bulk order.

\* \* \* \* \*